United States Patent
Herrmann

Patent Number: 5,949,366
Date of Patent: Sep. 7, 1999

[54] METHOD AND DEVICE FOR SENSING AN IMMINENT OR POSSIBLE COLLISION

[75] Inventor: Thomas Herrmann, Langenbrettach, Germany

[73] Assignee: Robert Bosch GmbH, Stuttgart, Germany

[21] Appl. No.: 09/080,579

[22] Filed: May 18, 1998

[30] Foreign Application Priority Data

May 17, 1997 [DE] Germany ............................ 197 20 843
Dec. 6, 1997 [DE] Germany ............................ 197 54 220

[51] Int. Cl.$^6$ ........................................................ G01S 13/06
[52] U.S. Cl. ................................................................. 342/72
[58] Field of Search .............................. 342/72, 70, 107; 701/45, 46, 47; 280/735, 728.1; 340/436; 180/274, 282; 307/10.1

[56] References Cited

U.S. PATENT DOCUMENTS

| | | |
|---|---|---|
| 3,823,399 | 7/1974 | Yamanaka et al. .................. 342/72 |
| 3,893,114 | 7/1975 | Yamanaka et al. . | |
| 4,143,370 | 3/1979 | Yamanaka et al. .................. 342/72 |
| 5,483,242 | 1/1996 | Grein et al. . | |

FOREIGN PATENT DOCUMENTS

| | | |
|---|---|---|
| 0 499 2700 | 8/1992 | European Pat. Off. . |
| 42 42 700 | 6/1994 | Germany . |
| 2290000 | 12/1995 | United Kingdom . |
| WO 80/01782 | 9/1980 | WIPO . |

OTHER PUBLICATIONS

Fraunhofer Institute For Chemical Technology, "Airbag 2000", 3rd Internatonal Symposium, Nov. 26/27, 1996.

*Primary Examiner*—Daniel T. Pihulic
*Attorney, Agent, or Firm*—Kenyon & Kenyon

[57] ABSTRACT

A method and a device for sensing and analyzing an imminent collision of a motor vehicle with an obstacle. Using an FMCW radar method, obstacles are detected in the form of a spectral line. Via a proper filtering, time profiles of amplitude values of the spectral lines are produced and recorded. By comparing one actively recorded time profile to stored characteristic profiles, a lateral offset y between the motor vehicle and the obstacle is determined. Alternatively or in combination, the lateral offset can also be determined on the basis of characteristic profiles of relative velocity values.

10 Claims, 7 Drawing Sheets

METHOD AND DEVICE FOR SENSING AN IMMINENT OR POSSIBLE COLLISION

FIELD OF THE INVENTION

The present invention relates to a method and a device for sensing a possible or imminent collision of a motor vehicle with an object.

BACKGROUND INFORMATION

A method for employing a pre-crash sensor is known from a publication of the Fraunhofer Institute for Chemical Technology, published under the title "Airbag 2000" on the occasion of the Third International Symposium on advanced safety systems for vehicle occupants from Nov. 26 through 27, 1996 in Karlsruhe, Germany. It describes using a FMCW radar system. The system compares the amplitude of two harmonic components, which are selected by band-pass filters. Imminent collisions can be anticipated at a distance of about 1.5 m. The relative crash velocity is measured using multiple Doppler cycles to calculate the time remaining until a crash at a distance of 0.5 m. The object size can be included by using the difference between the amplitudes of the harmonic components and the distribution of the relative velocities. This method renders possible an early detection of an imminent collision between a motor vehicle and an object. For a more intelligent safety system actuation, however, additional information is often desired, particularly with respect to a so-called offset, i.e., a lateral offset between the motor vehicle and the object. The significance of this information is reflected in the fact that the crash behavior of motor vehicles in response to so-called offset crashes is increasingly becoming a standard used by the automotive industry.

U.S. Pat. No. 3,893,114 describes a method and a device for sensing a collision. A continuous-wave radar method employing a frequency-modulated wave is used. To analyze a reflected and re-received radar signal, the signal is initially mixed with the transmitted signal active at the time and, in a second step, with the modulation signal. A plurality of different mixed products result thereby, which also contain, inter alia, Doppler signal components due to the Doppler effect. On the basis of a comparison of instantaneous values of two selected mixed products, a time is defined, which is a measure of the vehicle's distance from and its velocity relative to an obstacle. As a function of this time, as well as of other conditions, a signal is generated, indicating that a collision is imminent.

Both related-art devices referred to above are suited for making a decision whether a collision between a vehicle and an object is imminent. However, neither of the two devices is able to determine a lateral offset between the motor vehicle and the object.

SUMMARY OF THE INVENTION

An object of the present invention is to provide a method and a device for obtaining detailed information about an imminent collision between a motor vehicle and an object.

This object is achieved by comparing an active time profile of amplitude values of a filtered mixed signal or of relative velocity values to stored time profiles of amplitude values of filtered mixed signals or of relative velocity values. This active time profile results from a change in the distance between the motor vehicle and the object. On the basis of this comparison, a lateral offset between the motor vehicle and the object is defined.

A device according to the present invention is characterized in that provision is made for first means, which enable time profiles of amplitude values of filtered mixed signals or of relative velocity values to be stored, and in that provision is made for second means, which enable the stored profiles and at least one profile of amplitude values or of relative velocity values based on an active mixed signal to be compared to one another.

The present invention has the advantage of making it possible to obtain more detailed information about an imminent collision. In this context, the computing time or expenditure required is very small, particularly in comparison to an analysis of radar signals using a Fast Fourier Transform. This makes it advantageously possible to use, for purposes of signal analysis, a comparatively simple micro controller in place of a substantially more complex and, thus, more expensive digital signal processor. Moreover, because of its short computing time, the method is particularly suited for the targeted deployment of a side airbag.

The present invention is not limited solely to a pre-crash sensing in conjunction with an actuation of safety systems. It can likewise be used, for example, within the framework of a park distance control, where the aim is to avoid an imminent collision with an object. The measuring frequencies and filter and modulation bandwidth are then to be properly selected as a function of the distance to be monitored and the required measuring resolution. It is also possible, in some instances, for a device according to the present invention to be used for both applications.

Moreover, from a closer examination of the amplitude profile, individual amplitude values, or the standard deviation of the acquired amplitude values, one can estimate the size, structure, and/or the material of the object with which a collision is imminent. The device or the method according to the present invention is advantageously not applied separately, but rather in combination with known methods for detecting a collision, for example, in combination with known acceleration sensors.

DETAILED DESCRIPTION

German Patent No. 42 42 700, which corresponds substantially to U.S. Pat. No. 5,483,242, describes a basic FMCW radar system. In such a radar system, a preferably linearly frequency-modulated wave is radiated. Reflections received from an object are mixed with the active, transmitted signal. As a result, at least one mixed signal is formed, the frequency of which is a measure of at least the distance of the object from the radar system. In known radar systems, the frequencies of one or more mixed signals are often analyzed using a Fast Fourier Transform.

FIGS. 1a through 1d illustrate four spectral diagrams for elucidating the method according to the present invention. Each reveals a coordinate system, whose abscissa specifies a frequency f, and whose ordinate indicates an amplitude or level value P. In conformance with the basic principle of an FMCW radar, frequency f is proportional to the distance r between a detected object and the radar system. A detected object appears in the form of a spectral line 131, whose frequency is a measure of the distance of the object. Also sketched in FIGS. 1a through 1d are frequency response characteristics 10 and 11 of two filters. The filters are preferably so dimensionally designed that their frequency response characteristics show a substantially identical profile, but their respective mean mid-band frequencies and, thus, their respective pass-band widths, are different. The pass-band width of each of the two filters is preferably narrower than the frequency band within which its realistic mixed signals can occur. Depending on the specific filter circuit used, such as a Cauer (elliptic function) filter, ripple contents in the frequency response characteristics can arise both in the pass bands, as well as in the attenuation bands. This is symbolized in FIGS. 1a through 1d by a representation of the frequency response characteristics in the form of a $|(\sin x)/x|$–function. However, this profile of frequency response characteristics can only be understood by way of example. For a practical realization, all filter structures having frequency response characteristics are possible, in principle, for which, in response to different frequencies, the amplitude values assume different values that are able to be analyzed. The pass-band widths of the two frequency response characteristics 10 and 11 overlap one another here in part. A line 12 characterizes the frequency at which the pass-band widths of frequency response characteristics 10 and 11 intersect. Distance r, which corresponds to this frequency, is referred to as virtual barrier $B_v$.

Figure 1A:
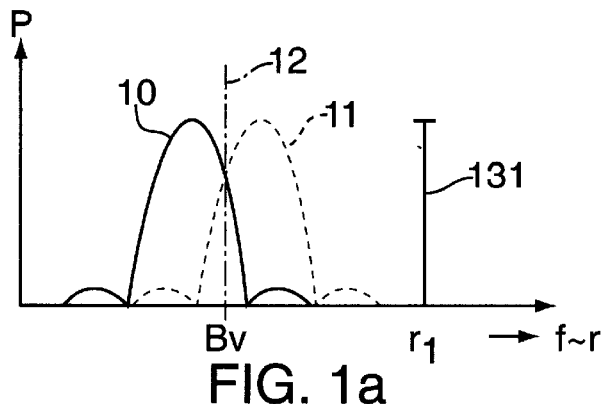
FIGS. 1a, 1b, 1c and 1d show four spectral diagrams, each diagram illustrating an amplitude P that is plotted against a frequency f.
Figure 1B:
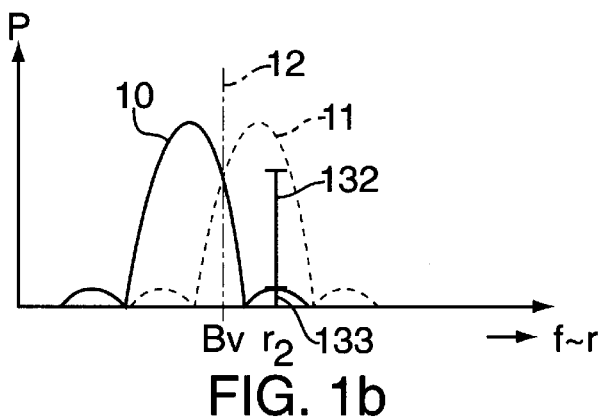
Figure 1C:
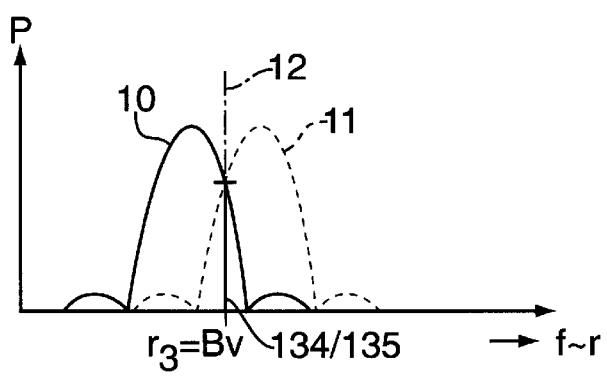
Figure 1D:
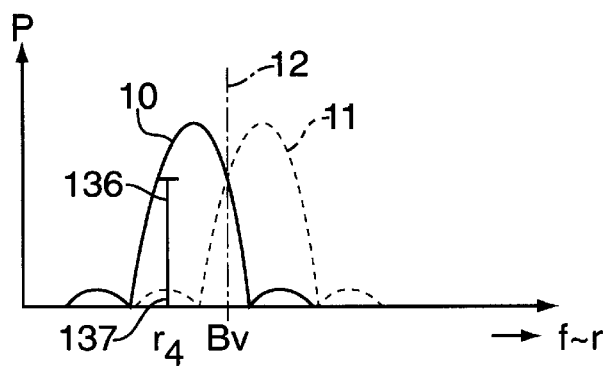

FIG. 1a shows a spectral line 131 disposed to the right of frequency response characteristics 10 and 11, indicating that a radar target is detected at a distance $r_1$. The height of spectral line 131 is assumed by way of example and indicates a maximum possible amplitude value for this target at this distance. FIG. 1b shows a situation where the radar target is situated at a distance $r_2$, which is smaller than distance $r_1$. Accordingly, a spectral line appears in response to a smaller frequency. At this point, spectral lines 132 and 133 (as sketched here) are formed at the output of each filter when the mixed signal is filtered out by two parallel-connected filters having frequency response characteristics 10 and 11. Spectral line 132 appears at the output of the filter having frequency response characteristic 11; spectral line 133 appears at the output of the filter having frequency response characteristic 10. The frequencies of the two spectral lines 132 and 133 are identical, since they are associated with one single radar target at distance $r_2$. Their amplitude values vary, however, as a function of frequency response characteristics 10 and 11. FIG. 1c illustrates a situation where the radar target is situated at a distance $r_3$, which is equal to virtual barrier $B_v$. In this case, at the outputs of the filters having frequency response characteristics 10 and 11, spectral lines 134 and 135 appear, which are identical in frequency as well as in amplitude. FIG. 1d shows the radar target at a distance $r_4$, which is smaller than virtual barrier $B_v$. In this case, spectral lines 136 and 137, which differ, in turn, in their amplitude values, appear at the outputs of the filters having frequency response characteristics 10 and 11.

According to a first exemplary embodiment, the method according to the present invention is based on the principle that to analyze reflected radar signals, provision is made for at least one, preferably for even two parallel-disposed filters having frequency response characteristics 10 or 11. The amplitude values and, in particular, time characteristics of amplitude values of the mixed signals filtered by this filter are analyzed.

Figure 2:
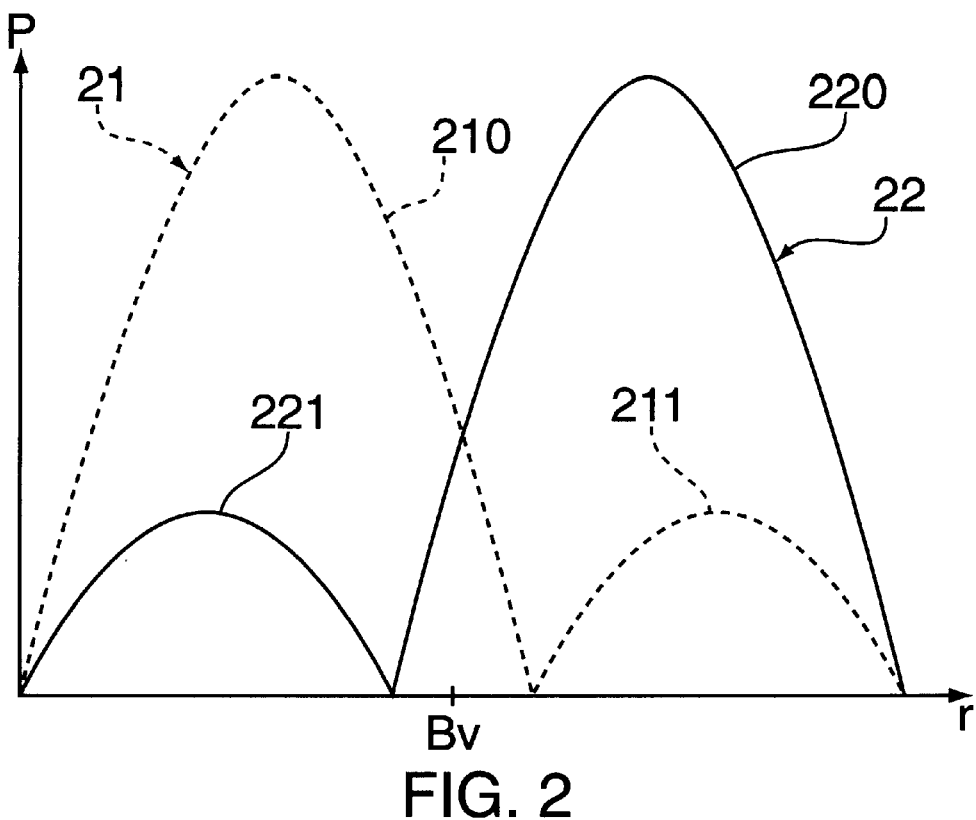
FIG. 2 shows schematic frequency response characteristics of two filters as a function of radial distance r.

FIG. 2 depicts frequency response characteristics of two filters corresponding to FIG. 1 on an enlarged scale. Plotted along the abscissa is a distance r, which is proportional to the frequency of the mixed signals. Plotted along the ordinate, in turn, is an amplitude or level value P. Two frequency response characteristics 21 and 22 are evident, which correspond to frequency response characteristics 10 and 11 of FIG. 1. Frequency response characteristics 21 and 22 are shown here, in turn, with an idealized, exemplary profile. These can be Cauer, Bessel, or Butterworth filters. As is generally known, filters of this kind have a pass-band width 210, which makes a smooth transition into an attenuation band. Within the attenuation band and also the pass band, the frequency response characteristic can have ripple contents, as indicated by adjacent peaks 211 or 221. As already mentioned, virtual barrier $B_v$ marks the point of intersection of pass-band widths 210 and 220.

Figure 3:
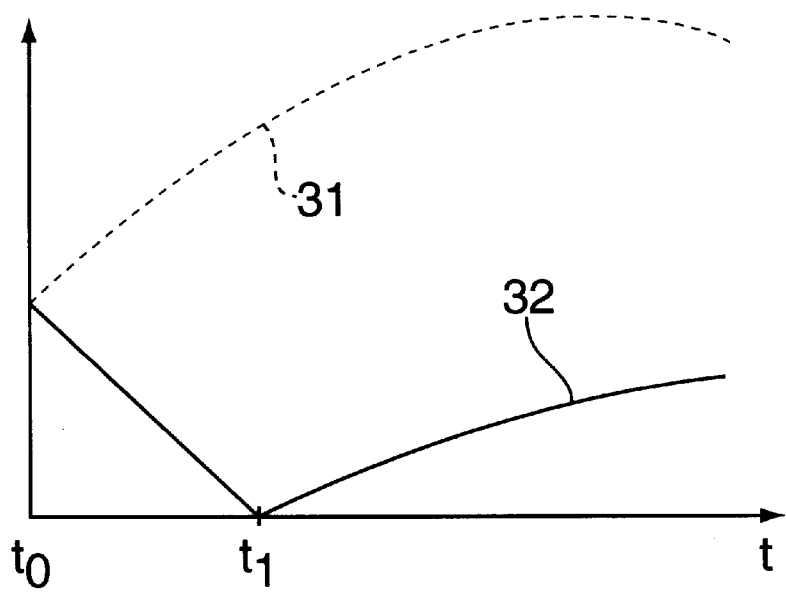
FIG. 3 shows two time profiles of amplitude values that are produced in accordance with the method of the present invention.

FIG. 3 shows two variations in amplitude over time, which result at the output of the two filters having frequency response characteristics 21 and 22, when the distance between a vehicle equipped with a device according to the present invention and an object becomes smaller. For the sake of clarity, it is assumed here that the vehicle is approaching an object at a constant velocity, so that distance r decreases linearly. This assumption is generally accurate in view of the small distances (0 m to 1.5 m) which play a role in the pre-crash sensing. For such a case, FIG. 3 shows the amplitude profiles produced at the output of the two filters with advancing time t. At the beginning of the representation is an instant $t_0$, where distance r between the vehicle and the object first assumes a value smaller than or equal to virtual barrier $B_v$. This corresponds to the situation according to FIG. 1c, where the amplitude values at the output of the two filters are identical. According to curve 31, the amplitude values at the output of the filter having frequency response characteristic 21 now increase with advancing time t and, accordingly, with decreasing distance r. On the other hand, the amplitude values at the output of the filter having frequency response characteristic 22 show a profile 32, which initially becomes smaller with advancing time and, accordingly, with decreasing distance r, and then rises again from a turning point $t_1$ and, thus, from a specific distance r. The actual profile of the amplitude values plays no part in one's basic understanding of the invention and depends, in particular, on the practical realization of the filters and, thus, on the specific manifestation of frequency response characteristics 21 and 22.

Figure 4:
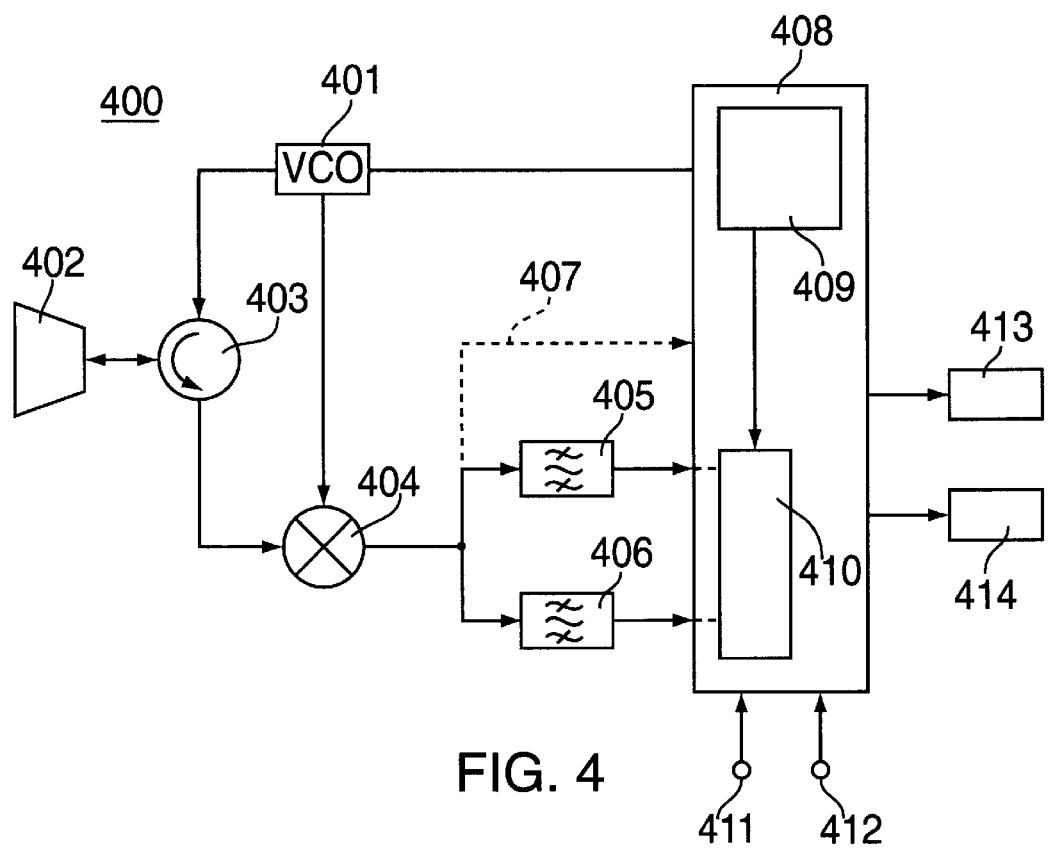
FIG. 4 shows a block diagram of a device according to the present invention.

FIG. 4 shows a schematic diagram of a device 400 according to the present invention. A control and evaluation unit 408, which may comprise, for example, a micro controller or a digital signal processor, is linked to an oscillator 401. The frequency of the oscillator 401 is determined by control and evaluation unit 408. The output signal from the oscillator 401 is fed via a transmit/receive separating filter 403 to a transmit/receive antenna 402. Provision is also made for a mixer 404, which is likewise linked to transmit/receive separating filter 403 and, in addition, to oscillator 401. This design corresponds to the known basic design of an FMCW radar system.

According to one preferred embodiment of the invention, the output signal from mixer 404 is supplied to two filters 405 and 406 that are arranged in parallel. Filters 405 and 406 preferably have the frequency response characteristics shown in FIG. 2. The output signals from filters 405 and 406 are fed to evaluation and control unit 408. Evaluation and control unit 408 includes, inter alia, a storage device 409 and a comparator unit 410, which enable individual amplitude values and also time profiles of amplitude values to be stored and compared. Alternatively, or in addition to one of the two filters 405, 406, the output signal from mixer 404 can also be fed directly to evaluation and control unit 408. This is indicated by dotted line 407. In addition, evaluation and control unit 408 receives a signal representing the actual velocity of the vehicle from velocity sensors 411. Moreover, according to one preferred embodiment of the present invention, one or a plurality of conventional acceleration sensors 412 supply their output signals to evaluation and control unit 408. After receiving these various input signals, evaluation and control unit 408 decides whether a collision of the vehicle is imminent and, if such an imminent collision is indicated, which safety systems must be activated and in which way. Evaluation and control unit 408 then triggers actuators 413 and 414, which activate belt tighteners or airbag systems, for example.

Figure 5:
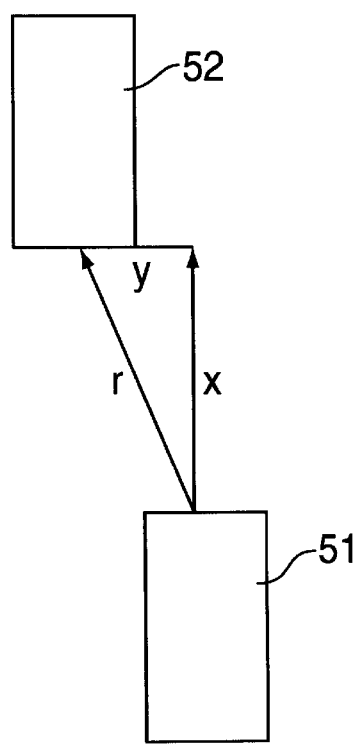
FIG. 5 shows an offset between two vehicles.

FIG. 5 schematically depicts a lateral offset, i.e., an offset of two vehicles 51 and 52 for purposes of defining the following required variables. According to the FIG. 5, radial distance r, which is measured by a radar sensor, is split into a perpendicular distance x and an offset y. In this context, the three variables have the following known relationship:

$$r = \sqrt{x^2 + y^2}$$

Figure 6:
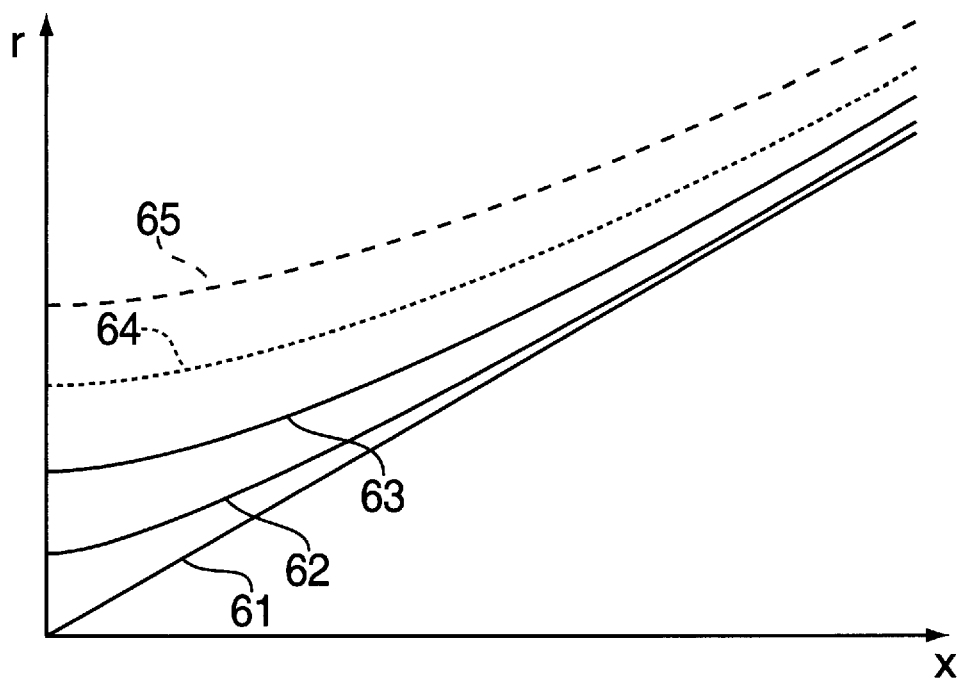
FIG. 6 shows the relation between a radial and a perpendicular distance between two vehicles, given different offsets.

Using a plurality of curves, FIG. 6 illustrates this functional relationship between perpendicular distance x from a vehicle to an object and distance r determined by the radar sensor. Straight line 61, which indicates a linear relationship between perpendicular distance x and sensor distance r, is formed in response to an offset y of zero. Curve 62 is formed in response to an offset y of 25 cm; curve 63 is formed in response to an offset y of 50 cm; curve 64 is formed in response to an offset y of 75 cm; and curve 65 is formed in response to an offset y of 1 m. As is easily discernible, sensor distance r increasingly deviates from perpendicular distance x when offset y between the two vehicles 51 and 52 becomes greater.

Figure 7:
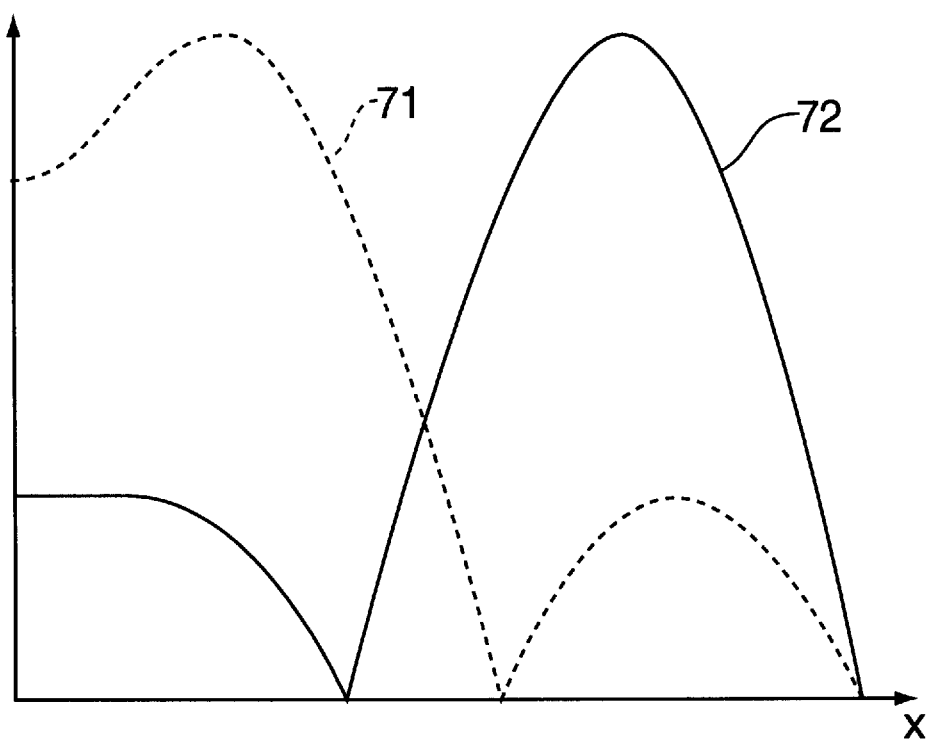
FIG. 7 shows two effective frequency response characteristics as a function of the perpendicular distance x.

FIG. 7 shows the effective frequency response characteristics of the two filters 405 and 406 in response to an assumed offset y of 50 cm, when radial distance r is no longer plotted along the abscissa, but rather only perpendicular distance x. In this context, the specific curves are given on an exemplary basis. What is essential in this consideration is that different effective frequency response characteristics are produced than in FIG. 2. The specific manifestation of such an effective frequency response characteristic is a function of the offset y in question. This becomes clear in view of the relationships according to FIG. 6, in particular when working with distances smaller than virtual barrier $B_v$. This circumstance can be used to define offset y, as elucidated in the following discussion.

Figure 8:
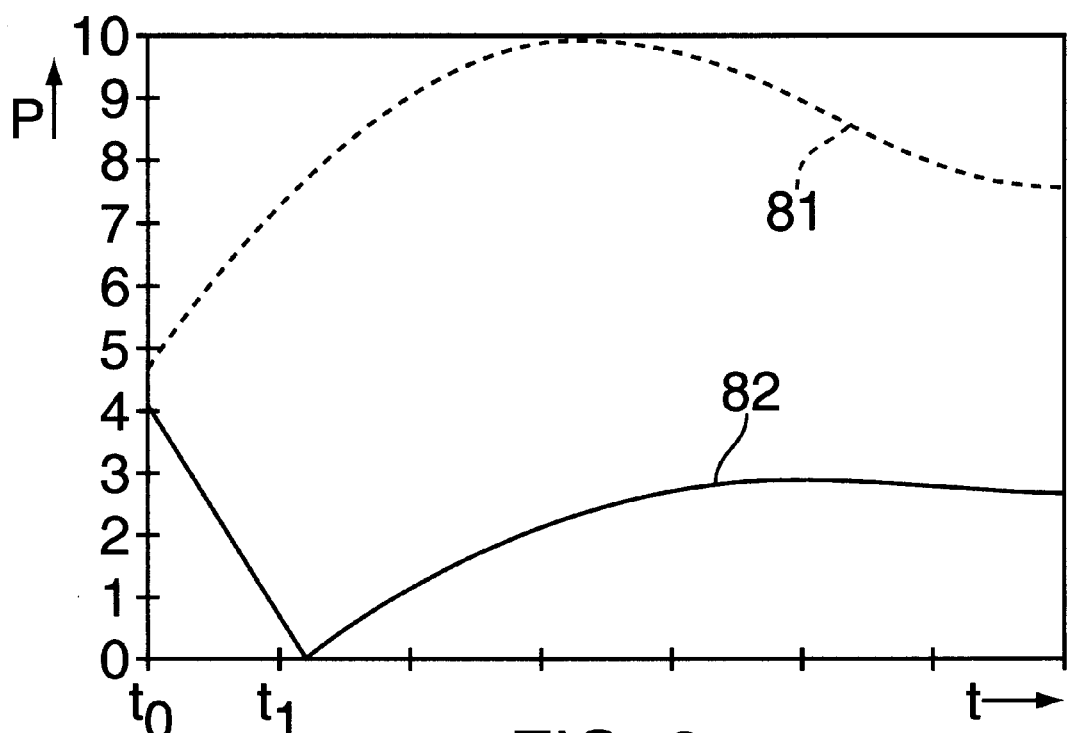
FIG. 8 shows exemplary amplitude profiles according to the present invention.

FIG. 8 shows two profiles 81 and 82 of amplitude values over time at the output of both filters 405 and 406, these profiles 81 and 82 being in response to an offset of 50 cm between the vehicle and the object. In comparison, the profiles in FIG. 3 are formed in response to an offset of 0 cm. The reason for these differently shaped profiles lies in the different effective frequency response characteristics according to FIGS. 2 and 7. These, in turn, as already explained, are a result of the non-linear relationship between perpendicular distance x and radial distance r. In this context, a condition for the described relationships is that the radar waves be reflected to the extent that is possible off of a central point of the object, as shown in FIG. 5. Of course, this is applicable only in an ideal, assumed model. However, by statistically evaluating the distribution of reflected received signals in advance, an "average, central reflection point" can be calculated.

Figure 9:
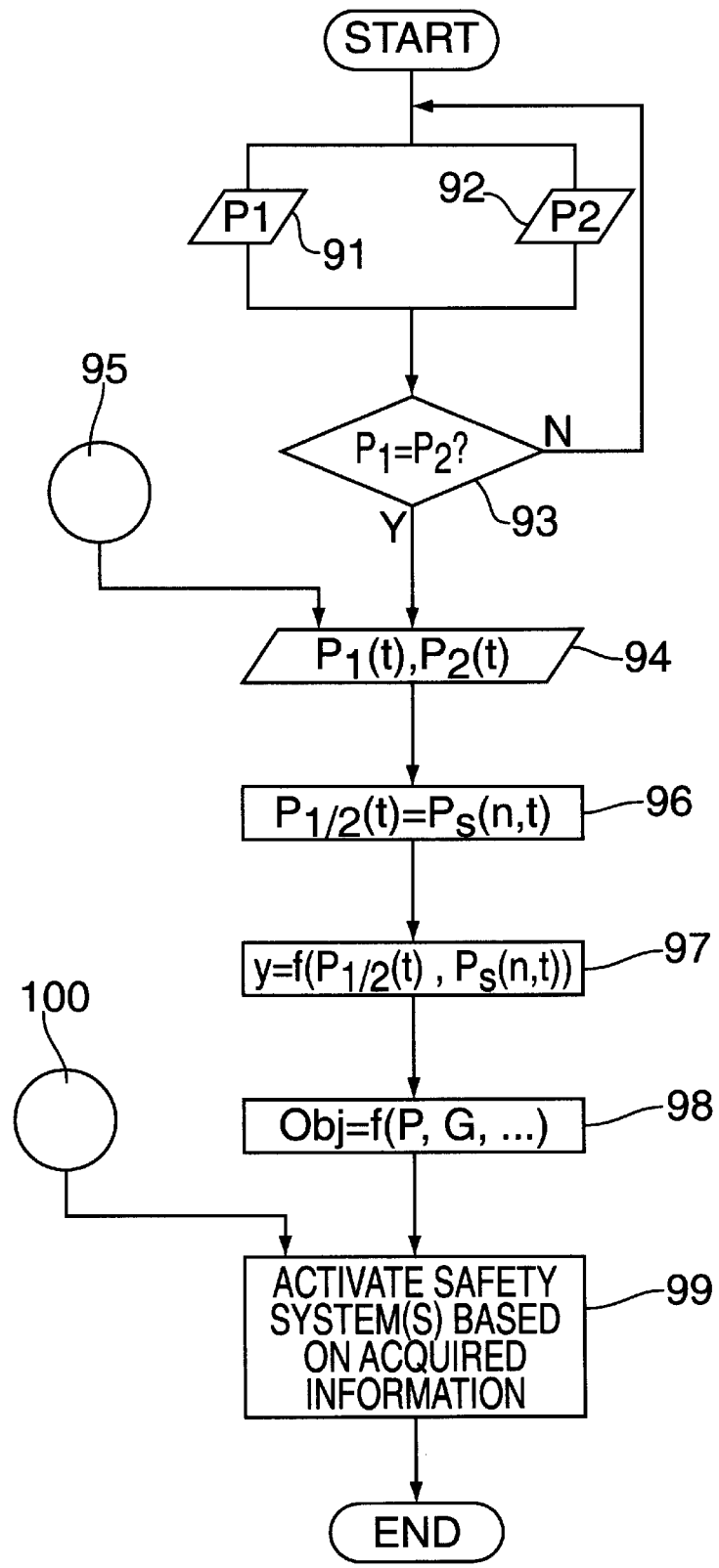
FIG. 9 shows a flow chart corresponding to the method according to the present invention.

FIG. 9 shows a flow chart of one possible realization of the method according to the present invention. At the beginning of the method, the output signals from filters 405 and 406 are read in at steps 90 and 91 in the form of amplitude or level values P1 and P2. In step 93 and in accordance with FIG. 1c, a query follows then in each case as to whether $P_1$ is equal to $P_2$. These method steps are repeated until query 93 is fulfilled, i.e., until $P_1$ actually equals $P_2$. If this is the case, i.e., expressed in concrete terms, if an obstacle breaks through the virtual barrier $B_v$, this event is recognized and preferably already considered as an indication of an imminent or possible collision. This event is now used as the basis for generating a trigger signal for the additional method steps. In step 94, active time profiles of amplitude or level values $P_1(t)$ and $P_2(t)$ according to FIGS. 2 and 8 are recorded and stored in storage device 409. Step 95 indicates that the length of time for which time profiles $P_1(t)$ and $P_2(t)$ are assumed, is preferably made a function of other variables, in particular of the active distance and the relative velocity between the vehicle and the object. In step 96, at least one of the actively recorded time profiles of amplitude values is compared to profiles $P_S(n,t)$ of amplitude values stored earlier on. In this context, variable n denotes a counting variable, which, according to FIG. 6, characterizes individual amplitude profiles $P_S(t)$ at different offsets y. Amplitude profiles $P_S(n,t)$ are characteristic amplitude profiles, which are formed in response to different offsets y between the vehicle and a possible obstacle, and which are stored once as a reference in storage device 409. According to step 97, on the basis of a comparison, at least one of amplitude profiles $P_1(t)$ or $P_2(t)$ is determined using stored amplitude profiles $P_S(n,t)$ of offset y, in that offset y is assumed for which the greatest conformity results between the current amplitude profiles $P_1(t)$, $P_2(t)$ and the stored amplitude profiles $P_S(n,t)$.

In principle, for purposes of the analysis, one comparison of active amplitude profiles $P_1(t)$ or $P_2(t)$ and the stored amplitude profiles would suffice. However, due to the redundancy and the high level of reliability required for the detection, it is beneficial to retrieve both profiles to determine offset y.

According to one preferred embodiment of the method, an object classification is carried out in step 98. This is actually a rough estimation of the variable, of the structure and/or of the material of the obstacle on the basis, for example, of the absolute quantity of amplitude values P received at a specific distance r and/or on the basis of scattering δ of the received reflection signals. Thus, one can, for example, start out from the assumption that, given a same distance r, the amplitude value of a signal reflected off of a large obstacle is greater than that of a signal reflected off of a small obstacle. In the same way, as is well known, metallic surfaces are more highly reflecting than, for example, wood or plastic. On the basis of such a rough object classification, one can infer the seriousness and, thus, the danger of an imminent collision. In step 99, information acquired up to that point is used to activate the motor vehicle's safety systems. These can include, according to FIG. 4, for example, airbags or belt tighteners. It is preferable that additional information according to step 100 also be considered in the decision of which safety systems to activate and how to activate them. This information can include, for example, signals from acceleration sensors 412 or from velocity sensors 411.

One alternative embodiment of the invention results when, in place of the previously described profiles of amplitude values, profiles of relative velocity values are retrieved to determine the lateral offset. As is generally known, when an FMCW radar sensor is used, it is not only possible to determine the distance, but also a relative velocity between the detected object and the radar sensor. This is carried out either on the basis of the time span between two successively determined distances, or quite advantageously on the basis of an analysis of the Doppler effect. In this context, to determine the relative velocity on the basis of the Doppler effect, it is not even necessary to modulate the radiated wave.

Figure 10:
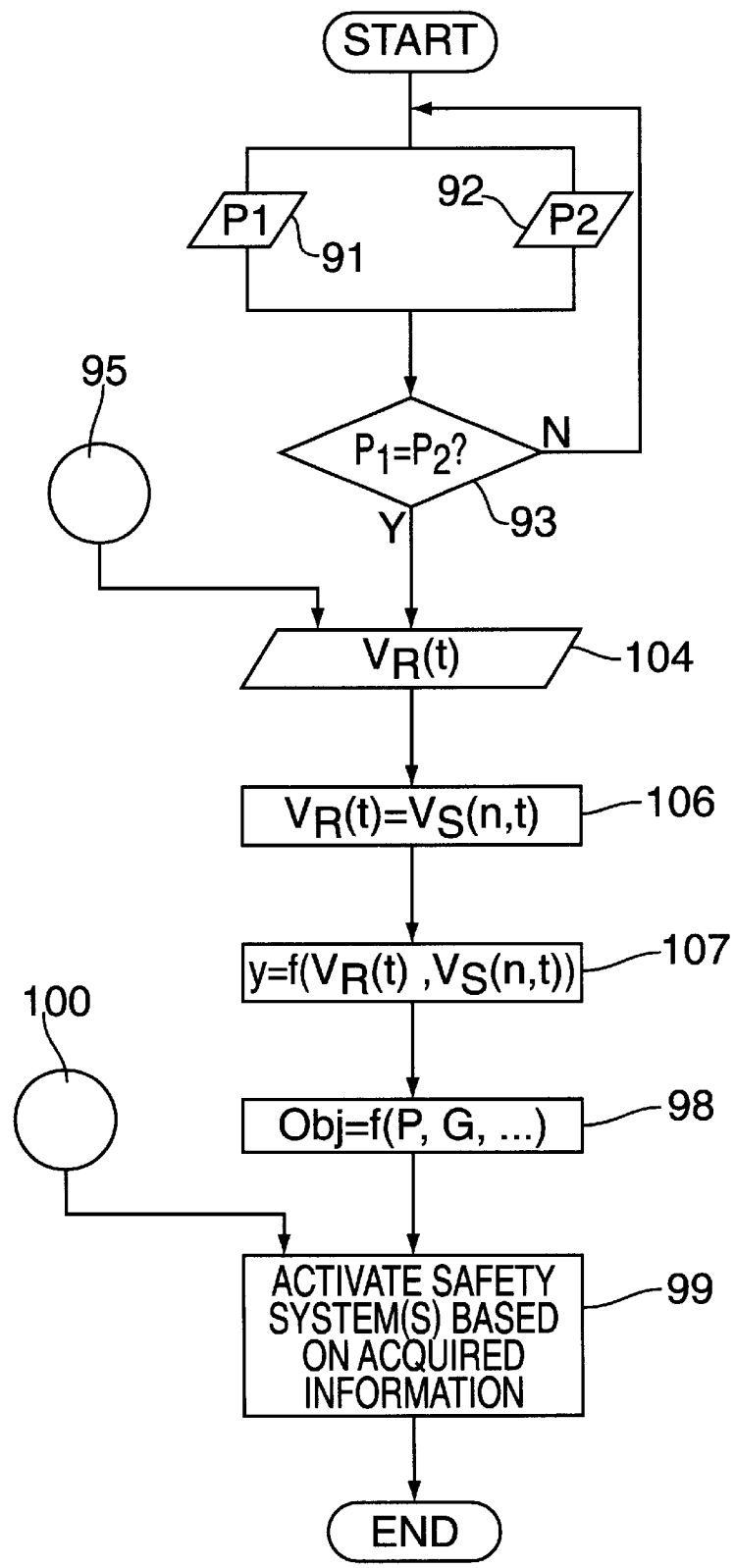
FIG. 10 shows a flow chart corresponding to a method based on the analysis of relative velocity values.

The explanations pertaining to the distances on the basis of FIG. 5 apply in a comparable manner to the relative velocities determined with the aid of the radar sensor. If a detected object has a lateral offset y to the radar sensor, then, using the latter, it is always only the radial relative velocity that is able to be determined instead of the perpendicular relative velocity in the x-direction. Accordingly, different characteristic profiles are likewise produced when specific relative velocity values for different offsets y are considered in succession. A method based on the analysis of relative velocity values is illustrated in FIG. 10. In this context, the steps designated with the same reference numerals correspond to those in FIG. 9. Steps 91 through 93, in turn, advantageously initially monitor whether an object approaching the vehicle penetrates virtual barrier $B_y$. If this is the case, the lateral offset of the object is determined on the basis of the following steps. To this end, in step 104, relative velocity values $V_R(t)$ between the object and the vehicle are determined in time succession. The time span specifying how long and, thus, how many relative velocity values are thereby determined, is itself preferably selected, in turn, on the basis of other variables (obtained in step 95), such as the distance, the vehicle velocity, or on the basis of the level of the relative velocity values. In step 106, the actively determined profile $V_R(t)$ of the relative velocity values is compared to stored profiles $V_S(n,t)$ of relative velocity values in response to different offsets. In step 107 then, that offset is defined as offset y whose stored profile $V_S(n,t)$ shows the greatest similarity to actively determined profile $V_R(t)$. The subsequent, preferably following steps 99 through 100, in turn, are the same as already clarified with respect to FIG. 9.

To improve upon the reliability of the offset determination, both methods explained here as optional methods can, of course, also be combined with one another; this means that the lateral offset is determined both on the basis of the amplitude profiles as well as on the basis of the relative velocity profiles.

What is claimed is:

1. A method for sensing an imminent collision of a motor vehicle with an object, comprising the steps of:

radiating a frequency-modulated wave from a device coupled to the motor vehicle;

receiving a wave reflected off of the object;

mixing the received wave with a component of the frequency-modulated wave to form at least one mixed signal having a frequency that is a measure of a distance between the motor vehicle and the object;

filtering the at least one mixed signal by using at least one filter, wherein the at least one filter has a frequency response characteristic that causes an amplitude of the at least one filtered mixed signal to assume different amplitude values in response to a change in the distance between the motor vehicle and the object;

comparing an active time profile of the amplitude values of the at least one filtered mixed signal to at least one stored time profile of amplitude values of previous filtered mixed signals, wherein the active time profile results from the change in the distance between the motor vehicle and the object; and defining a lateral offset between the motor vehicle and the object as a function of the comparison between the active time profile and the at least one stored time profile.

2. The method according to claim 1, further comprising the step of:

recording the active time profile for a period of time, wherein the period of time is determined as a function of at least one of a relative velocity between the motor vehicle and the object and the distance between the motor vehicle and the object.

3. The method according to claim 1, wherein the frequency response characteristic of the at least one filter has a pass-band width that is narrower than a frequency band within which realistic mixed signals occur.

4. The method according to claim 1, wherein the at least one filter includes two parallel-connected filters, and wherein the filtering step includes the steps of:

supplying the at least one mixed signal to the two parallel-connected filters, one of the two parallel-connected filters having a pass-band width that partially overlaps a pass-band width of the other of the two parallel-connected filters; and detecting a state in which the amplitude values of the at least one filtered mixed signal are substantially the same.

5. The method according to claim 1, further comprising the step of:

estimating at least one of a size, a structure, and a material of the object as a function of at least one of the amplitude values of the at least one mixed signal and a scattering of the amplitude values of the at least one mixed signal.

6. A method for preventing a collision of a motor vehicle with an object, comprising the steps of:

radiating a frequency-modulated wave from a device coupled to the motor vehicle;

receiving a wave reflected off of the object;

mixing the received wave with a component of the frequency-modulated wave to form a mixed signal;

determining a relative velocity between the motor vehicle and the object as a function of the mixed signal;

comparing an active time profile of relative velocity values to at least one stored time profile of previous relative velocity values, wherein the active time profile results from a change in a relative position between the motor vehicle and the object; and defining a lateral offset between the motor vehicle and the object as a function of the comparison of the active time profile to the at least one stored time profile.

7. A device for sensing an imminent collision of a motor vehicle with an object, comprising:

a transmitting device for emitting a frequency-modulated wave;

a receiving device for receiving a wave reflected off of the object;

a mixing device, in communication with the receiving device, for mixing the received wave with the transmitted frequency-modulated wave;

at least one filter, in communication with the mixing device, for filtering out a mixed signal between the transmitted frequency-modulated wave and the received wave; and a control device in communication with the at least one filter, the control device including:

a storage device for storing at least one profile of at least one of filtered mixed signal amplitude values and relative velocity values, and a comparison device, in communication with the storage device, for comparing the at least one stored profile with at least one further profile of at least one of amplitude values and relative velocity values based on an active mixed signal.

8. The device according to claim 7, wherein the at least one filter has a frequency response characteristic that causes an amplitude of the filtered mixed signal to assume different values in response to a change in a distance between the motor vehicle and the object.

9. The device according to claim 8, wherein the frequency response characteristic of the at least one filter has a passband width that is narrower than a frequency band within which realistic mixed signals occur.

10. The device according to claim 7, wherein the at least one filter includes two parallel-connected filters, one of the two parallel-connected filters having a pass-band width that partially overlaps a pass-band width of the other of the two parallel-connected filters.

* * * * *